United States Patent
Deng et al.

(10) Patent No.: US 11,967,698 B2
(45) Date of Patent: Apr. 23, 2024

(54) APPARATUS FOR ROLLING ELECTRODE PLATE

(71) Applicant: JIANGSU CONTEMPORARY AMPEREX TECHNOLOGY LIMITED, Changzhou (CN)

(72) Inventors: Zhikai Deng, Changzhou (CN); Shisong Li, Changzhou (CN); Tuo Zheng, Changzhou (CN); Xuanyin Chen, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/340,901

(22) Filed: Jun. 26, 2023

(65) Prior Publication Data

US 2023/0335704 A1 Oct. 19, 2023

Related U.S. Application Data

(63) Continuation of application No. PCT/CN2022/119631, filed on Sep. 19, 2022.

(30) Foreign Application Priority Data

Oct. 15, 2021 (CN) .......................... 202122494959.3

(51) Int. Cl.
*H01M 4/04* (2006.01)
*H01M 4/02* (2006.01)

(52) U.S. Cl.
CPC .... *H01M 4/0435* (2013.01); *H01M 2004/021* (2013.01)

(58) Field of Classification Search
CPC ..... B05C 11/025; H01M 4/0435; Y02E 60/10
See application file for complete search history.

(56) References Cited

U.S. PATENT DOCUMENTS

2021/0119197 A1* 4/2021 Wu ........................ B05C 11/025
2024/0047636 A1* 2/2024 Lee .......................... B05D 7/14

FOREIGN PATENT DOCUMENTS

CN  206022538 U  3/2017
CN  110890519 A  3/2020
(Continued)

OTHER PUBLICATIONS

International Search Report received in the corresponding International Application PCT/CN2022/119631, mailed Dec. 5, 2022.
(Continued)

*Primary Examiner* — Minh N Trinh
(74) *Attorney, Agent, or Firm* — Kilpatrick Townsend & Stockton LLP (57) ABSTRACT

Provided are a rolling apparatus and a processing device, which are used for rolling an electrode plate. The rolling apparatus includes a first roller and a second roller, where the first roller and the second roller are disposed at two sides of the electrode plate in a thickness direction of the electrode plate. The first roller is provided with a plurality of recessed portions, the electrode plate includes a plurality of insulation coating layer regions and a plurality of tabs, and in a projection of the electrode plate in the thickness direction, at least part of a projection of the insulation coating layer region and a projection of the tab are located within a projection of the recessed portion. The rollers deflect under a large rolling pressure.

10 Claims, 4 Drawing Sheets

(56) References Cited

FOREIGN PATENT DOCUMENTS

| | | | |
|---|---|---|---|
| CN | 112044958 | A | 12/2020 |
| CN | 216262704 | U | 4/2022 |
| DE | 102022133255 | A1 * | 10/2023 |
| JP | H0528990 | A | 2/1993 |
| JP | 2019033041 | A | 2/2019 |

OTHER PUBLICATIONS

Written Opinion received in the corresponding International Application PCT/CN2022/119631, mailed Dec. 5, 2022.

* cited by examiner

APPARATUS FOR ROLLING ELECTRODE PLATE

CROSS-REFERENCE TO RELATED APPLICATIONS

This application is a continuation of International Application PCT/CN2022/119631, filed Sep. 19, 2022, which claims priority to Chinese Patent Application No. 202122494959.3, filed on Oct. 15, 2021 and entitled "ROLLING APPARATUS AND PROCESSING DEVICE", which are incorporated herein by reference in their entireties.

TECHNICAL FIELD

This application relates to the field of electrode plate processing technologies, and in particular, to a rolling apparatus and a processing device.

BACKGROUND

Compared with conventional electrode plates, electrode plates of high-power batteries are characterized by lighter coating weight, smaller rolling thickness and larger tab area. In conventional rolling, to achieve the target thickness (target compacted density) of such thin-coating electrode plate, a processing device applies great pressure on a roller, and the roller may deflect, raising the risk of crushing tabs and insulation coating layer regions by the roller due to contact with the roller surface.

SUMMARY

In view of the foregoing problem, this application provides a rolling apparatus and a processing device for solving a problem that a tab is easily crushed by a roller.

According to a first aspect, this application provides a rolling apparatus including: a first roller, where the first roller is provided with a plurality of recessed portions; and a second roller; where the first roller and the second roller are disposed at two sides of an electrode plate in a thickness direction of the electrode plate, the electrode plate includes a plurality of insulation coating layer regions and a plurality of tabs, and in the thickness direction of the electrode plate, at least part of a projection of the insulation coating layer region and a projection of the tab are located within a projection of the recessed portion.

With the first roller provided with the recessed portion, in a projection of the electrode plate in the thickness direction, at least part of a projection of the insulation coating layer region and a projection of the tab are located within a projection of the recessed portion, leaving the tab at a place at which the recessed portion is located in the process of rolling the electrode plate. When the first roller deflects under a large rolling pressure, the probability of a surface of the first roller coming into contact with the tab is reduced, thus lowering the risk of crushing the tab.

In a possible embodiment, depth of the recessed portion is 50 micrometers to 150 micrometers.

If depth of the recessed portion is less than 50 micrometers, after the first roller deflects, a bottom wall of the recessed portion may protrude in a radial direction of the first roller, causing the bottom wall of the recessed portion to come into contact with the tab. This raises the risk of crushing the tab by the first roller, and increases the probability of fracturing in the subsequent processes of stretching and ultrasonic welding. If depth of the recessed portion is greater than 150 micrometers, the degree of deflection may increase under a same rolling pressure applied to the first roller, such that a side wall of the recessed portion is likely to come into contact with the tab, thus raising the risk of the tab being crushed by the first roller and subsequently fracturing in the processes of stretching and ultrasonic welding. When depth of the recessed portion is 100 micrometers, a bottom wall of the recessed portion is ensured not to come into contact with the tab, and the possibility of large deflection of the first roller is low.

In a possible embodiment, width of the insulation coating layer region is m, width of the tab is n, and width of the recessed portion is $l_1$, where $l_1 = \frac{1}{2}m + n$.

The width $l_1 l_1$ of the recessed portion is a sum of the width m of the insulation coating layer region and the width n of the tab, so that in a projection of the electrode plate in the thickness direction, a projection of the tab can be entirely located within a projection of the recessed portion. After the first roller deflects due to a large rolling pressure, the recessed portion also deforms with the first roller, an opening of the recessed portion becomes smaller, and the width of the recessed portion is a sum of ½ the width of the insulation coating layer region and the width of the tab, making the width of the recessed portion still greater than the width of the tab after deformation. This reduces the probability of a surface of the first roller coming into contact with the tab, thus lowering the risk of crushing the tab.

In a possible embodiment, each edge of the recessed portion is provided with a first chamfer.

The provision of the first chamfer at each edge of the recessed portion can reduce indentations on the tab caused by a pressure coming from the concentrated rolling pressure at the edge of the recessed portion, thus lowering the risk of cracking the tab in the subsequent ultrasonic welding. A cross-sectional area of the recessed portion gradually increases along the radial direction of the first roller, so that the width of the opening of the recessed portion can be the same as the widths of the insulation coating layer region and the tab on the electrode plate. This reduces the probability of the insulation coating layer region coming into contact with a surface of the first roller in the process of rolling the electrode plate, lowers the risk of crushing the insulation coating layer region, and improves the processing efficiency of the electrode plate.

In a possible embodiment, the electrode plate includes film-coating regions, the first roller includes first protruding portions, the first protruding portion is in contact with the film-coating region, and a surface of the first roller is in no contact with the tab and the insulation coating layer region.

The film-coating region being in contact with the first protruding portion allows the film-coating region to be subjected to a pressure applied by the first roller, thus achieving a desired compacted density of the film-coating region. The surface of the first roller being in no contact with the tab and the insulation coating layer region makes the tab and the insulation coating layer region not subjected to a pressure applied by the first roller, thus lowering the risk of crushing the tab and the insulation coating layer region.

In a possible embodiment, the second roller includes second protruding portions, at least part of the second protruding portion is able to extend into the recessed portion, and the second protruding portion is configured to contact the tab.

With the second protruding portion being in contact with the tab, the tab protrudes along the thickness direction of the electrode plate after rolling, so that redundancy in the tab region can be released, where such redundancy is produced due to the lateral elongation of the film-coating region being greater than the lateral elongation of the tab region after the electrode plate is rolled. This reduces wrinkling of the tab region, thus lowering the risk of fracturing in the subsequent processes of stretching and ultrasonic welding, decreasing production costs of the electrode plate, and improving production efficiency.

In a possible embodiment, the recessed portion includes a plurality of first recessed portions and a plurality of second recessed portions, the first recessed portions are located at two opposite sides of the first roller in an axial direction of the first roller, the second recessed portions are located between two first recessed portions, and at least part of the second protruding portion is able to extend into the second recessed portion.

Since the tab corresponding to the first recessed portion has a free end, redundancy of the tab produced by different elongations can be released through the free end, and no wrinkling occurs. Therefore, the position at the second roller corresponding to the first recessed portion can be provided with no second protruding portion. The position at the second roller corresponding to the first recessed portion being provided with no second protruding portion can reduce processing procedures in the process of producing the second roller, thus saving processing costs of the second roller, and improving the production efficiency of the second roller.

In a possible embodiment, height of the second protruding portion is 30 micrometers to 80 micrometers.

If height of the second protruding portion protruding out of a surface of the second roller is less than 30 micrometers, in the process of rolling the electrode plate, the second protruding portion is unable to make the tab protrude to a desired height in the thickness direction of the electrode plate, and redundancy produced by different elongations of the tab and film-coating region cannot be fully released. The tab may still wrinkle and subsequently fracture in the processes of stretching and ultrasonic welding. If height of the second protruding portion protruding out of a surface of the second roller is greater than 80 micrometers, in the process of rolling the electrode plate, the second protruding portion makes the tab protrude to a height greater than the desired height in the thickness direction of the electrode plate. Therefore, the tab is more severely deformed, which in turn reduces mechanical properties of the tab and makes fracture likely to occur in the subsequent processes of stretching and ultrasonic welding. If height of the second protruding portion is 50 micrometers, most redundancy at the tab of the electrode plate can be released without causing wrinkling at the tab or crushing the tab.

In a possible embodiment, each edge of the second protruding portion is provided with a second chamfer.

The provision of the second chamfer at each edge of the second protruding portion can reduce indentations on the tab caused by a pressure coming from the concentrated rolling pressure at the edge, thus lowering the risk of fracturing the tab in the subsequent stretching or cracking the tab in the subsequent ultrasonic welding.

In a possible embodiment, width of the insulation coating layer region is m, width of the tab is n, and width of the second protruding portion is $l_2$, where $$l_2 = \tfrac{1}{2}m + n \cdot l_2 l_2 = \tfrac{1}{2}m + n$$

The width $l_2$ of the second protruding portion corresponding to the recessed portion is a sum of ½ the width m of the insulation coating layer region and the width n of the tab.

Since the cross-sectional area of the second protruding portion decreases along the radial direction of the second roller, the second protruding portion can apply a pressure on the tab without affecting the insulation coating layer region, and the width of the second protruding portion in contact with the tab can be the same as the width of the tab. Therefore, in the process of rolling, the second protruding portion allows the tab to protrude out of the surface of the electrode plate without changing the width of the tab, reducing the impact on the subsequent processing.

According to a second aspect, this application provides a processing device including the rolling apparatus according to any of the foregoing embodiments.

In the process of rolling the electrode plate, the rollers may deflect due to a large rolling pressure, and thus the tab and the insulation coating layer region may be crushed. The processing of the electrode plate using the foregoing processing device can make a gap for the tab and the insulation coating layer region to keep them from coming into contact with the first roller, lowering the risk of crushing the tab and the insulation coating layer region and thereby reducing fractures of the electrode plate in the subsequent stretching or cracking of the electrode plate in the subsequent ultrasonic welding. After rolling of the electrode plate, due to different elongations of the tab region and the film-coating region, redundancy may occur at the tab having film-coating regions on its two sides, resulting in wrinkling at the tab. The provision of the second protruding portion at the second roller allows the redundancy to be released, thus reducing wrinkling at the tab. Such processing device ensures the compaction degree of the electrode plate, and reduces the probability of damaging the tab, thus decreasing production costs and improving production yields.

This application relates to a rolling apparatus and a processing device, which are used for rolling an electrode plate. The rolling apparatus includes a first roller and a second roller, where the first roller and the second roller are disposed at two sides of the electrode plate in a thickness direction of the electrode plate. The first roller is provided with a plurality of recessed portions, the electrode plate includes a plurality of insulation coating layer regions and a plurality of tabs, and in a projection of the electrode plate in the thickness direction, at least part of a projection of the insulation coating layer region and a projection of the tab are located within a projection of the recessed portion. The rollers deflect under a large rolling pressure. The recessed portion can make a gap for the tab when the first roller deflects, reducing the probability of the first roller coming into contact with the tab, lowering the risk of crushing the tab by the rollers, and reducing fractures in the subsequent processes of stretching and ultrasonic welding.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts. In the accompanying drawings.

Reference signs in specific embodiments are as follows:
electrode plate 1; insulation coating layer region 11; tab 12; film-coating region 13;
first roller 2; recessed portion 21; first recessed portion 211; second recessed portion 212; first chamfer 22; first protruding portion 23;
second roller 3; second protruding portion 31; and second chamfer 32.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments rather than to constitute any limitation on this application. The terms "include", "comprise", and "have" and any other variations thereof in the specification, the claims and the foregoing brief description of drawings of this application are intended to cover non-exclusive inclusions.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with other embodiments.

In the descriptions of embodiments of this application, the term "and/or" in this application describes only an association relationship for describing associated objects and represents that three relationships may be present. For example, A and/or B may represent the presence of the three cases: A alone, both A and B, and B alone. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, or may refer to a direct connection, an indirect connection via an intermediate medium, or an interaction between two elements. Persons of ordinary skill in the art can understand specific meanings of these terms in this application as appropriate to specific situations.

At present, from the perspective of market development, application of electric vehicle batteries is becoming more and more extensive. Traction batteries have been widely used in energy storage power supply systems such as hydroelectric power plants, thermal power plants, wind power plants, and solar power plants, and many other fields including electric transportation tools such as electric bicycles, electric motorcycles, and electric vehicles, military equipment, and aerospace. As the application fields of traction batteries continue to expand, market demands for traction batteries are also expanding.

The compacted density of the electrode plate for lithium-ion battery is related to the electrochemical performance of the battery. Reasonable control of compacted density of a positive or negative electrode plate material can reduce the membrane resistances of battery electrode plates, improve consistency of the membrane resistances of the battery electrode plates and consistency of the current densities of the battery electrode plates, reduce polarization loss, increase the discharge capacity and discharge rate of the battery, enhance adhesion between powder layers of the electrode plates and current collectors, and improve the processing performance of the battery electrode plates and the service life of the battery. The applicant has noted that electrode plates of high-power batteries are characterized by light coating weight, small rolling thickness and large tab area. In conventional rolling, to achieve a target thickness (target compacted density) of the thin-coating electrode plate used by high-power batteries, rollers are prone to deflect due to a large rolling pressure, which may in turn crush the tab and increase the risk of fracturing in the subsequent processing. In addition, wrinkling may occur at the tab due to different elongations of different regions of the electrode plate, which in turn leads to decreased ultrasonic welding strength of the tab, as well as increased resistance, fast heating during charging and discharging, and accelerated cycle life decay of the battery. Wrinkling at the tab may also pierce a separator and cause short circuits and other problems, resulting in production bottlenecks in the rolling process and losses in yield.

In the prior art, a cross section of the roller body of a roller is set as a curved surface, with a distance from the extension line where the apex of the curved surface is located to the center of the extension line where the end point of the curved surface is located being H, H being 2 μm to 3 μm, so that the deflection of the roller body under a main pressure is offset by the curved surface of the roller, thus forming a flat working surface to ensure the thickness consistency of the electrode plate in a transverse direction and reduce the chance of crushing the tab at the edge. This design is greatly affected by the main pressure, which makes the service life of the roller shorter. In addition, due to the small thickness of the film-coating region of the thin-coating electrode plate, in the process of rolling, the thickness of the film-coating region may be smaller than the thickness of the insulation coating layer region, and the flat working surface is likely to crush the insulation film-coating region, which may cause the electrode plate to fracture in the subsequent processes of stretching and ultrasonic welding. A boss is provided around the outer surface (a side surface, not an end surface) of the roller, and the boss is integrally formed on the outer surface of the roller, mainly used for pressing the tab on the electrode plate when the electrode plate is rolled by the roller. Therefore, when the film-coating surface is rolled by the roller, the boss also presses the tab, thus forming a tension on the surface of the tab. The presence of this external tension makes up for the difference in tensions on the tab and the film-coating surface on the electrode plate, making the tensions on the tab and the film-coating surface on the electrode plate nearly equal, so that wrinkling at the tab caused by insufficient tension can be avoided in the rolling process. Such roller makes the tab region also subject to a large pressure, which in turn can easily cause the tab to be crushed and cause the electrode plate to fracture in the subsequent stretching or ultrasonic welding. The embodiments of this application provide a rolling apparatus and a manufacturing device for rolling electrode plates, so as to reduce the problem that a tab is crushed due to the deflection of the roller caused by a large pressure, and thus lower the risk of fracturing of the electrode plate in the subsequent processes of stretching and ultrasonic welding.

Figure 1:
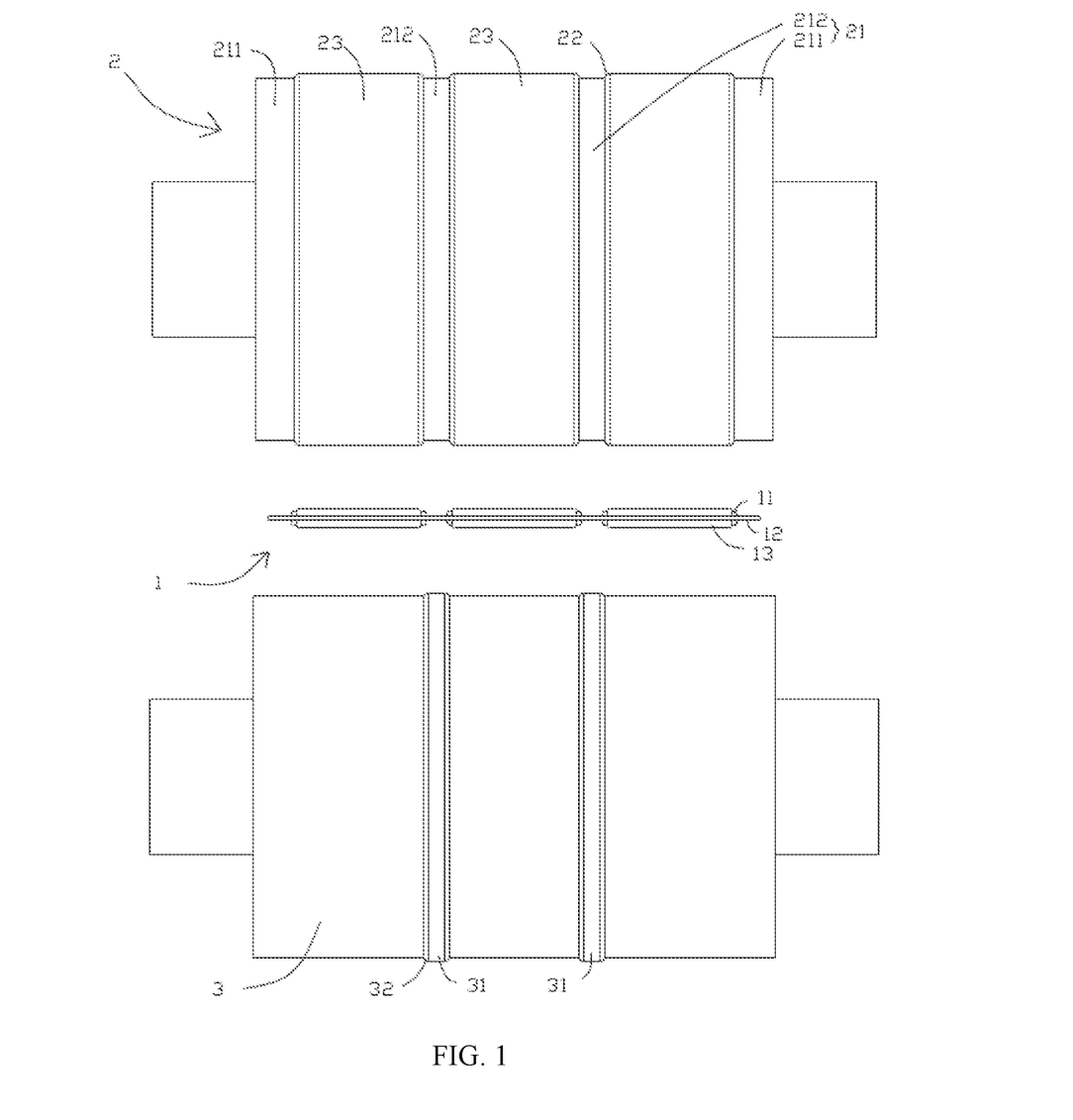
FIG. 1 is an exploded view of a rolling apparatus according to some embodiments of this application.

As shown in FIG. 1, this application provides a rolling apparatus configured to roll an electrode plate 1. The rolling apparatus includes a first roller 2 and a second roller 3. The first roller 2 is provided with a plurality of recessed portions 21, and the electrode plate 1 includes a plurality of insulation coating layer regions 11 and a plurality of tabs 12. The first roller 2 and the second roller 3 are disposed at two sides of the electrode plate 1 in a thickness direction of the electrode plate 1, and in the thickness direction of the electrode plate 1, at least part of a projection of the insulation coating layer region 11 and a projection of the tab 12 are located within a projection of the recessed portion 21.

Compared with a conventional rolling apparatus, a cross section of the roller in an axial direction is rectangular and is horizontal to the part in contact with the electrode plate 1. The roller may come into contact with the tab 12 due to deflection under a large rolling pressure, applying a pressure on the tab 12, which will in turn cause the tab 12 to be crushed and probably fracture in the subsequent processes of stretching and ultrasonic welding. In the embodiment of this application, the first roller 2 is provided with the recessed portion 21, and in a projection of the electrode plate 1 in the thickness direction, at least part of a projection of the insulation coating layer region 11 and a projection of the tab 12 are located within a projection of the recessed portion 21, so that in the process of rolling the electrode plate 1, the tab 12 is located at a position of the recessed portion 21. This reduces the probability of the tab 12 coming into contact with a surface of the first roller 2 and thereby lowers the risk of the tab 12 being crushed when the first roller 2 deflects under a large rolling pressure.

Figure 2:
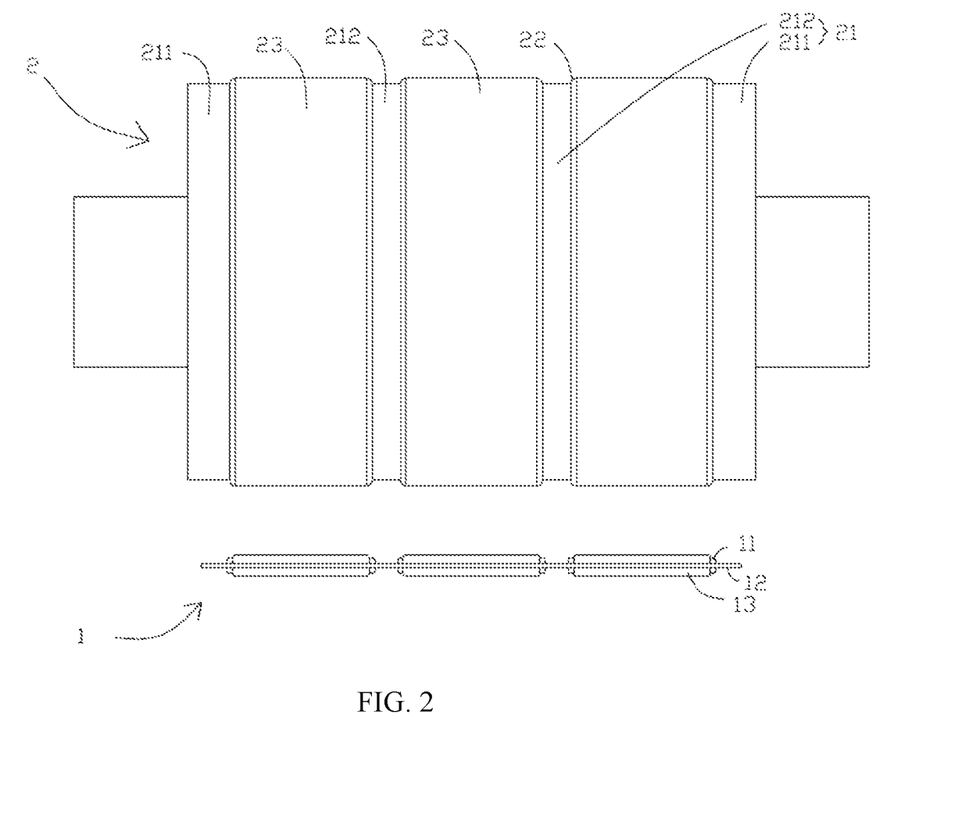
FIG. 2 is a schematic structural diagram of a first roller according to some embodiments of this application.

As shown in FIG. 2, in a possible embodiment, depth of the recessed portion 21 in the first roller 2 is 50 micrometers to 150 micrometers, and preferably, the depth of the recessed portion 21 is 100 micrometers.

If depth of the recessed portion 21 is less than 50 micrometers, after the first roller 2 deflects, a bottom wall of the recessed portion 21 may protrude in a radial direction of the first roller 2, causing the bottom wall of the recessed portion 21 to come into contact with the tab 12. This raises the risk of crushing the tab 12 by the first roller 2, and increases the probability of fracturing in the subsequent processes of stretching and ultrasonic welding. If depth of the recessed portion 21 is greater than 150 micrometers, the degree of deflection may increase under a same rolling pressure applied to the first roller 2, such that a side wall of the recessed portion 21 is likely to come into contact with the tab 12, thus raising the risk of the tab 12 being crushed by the first roller 2 and subsequently fracturing in the processes of stretching and ultrasonic welding. When depth of the recessed portion 21 is 100 micrometers, a bottom wall of the recessed portion 21 is ensured not to come into contact with the tab 12, and the possibility of large deflection of the first roller 2 is low.

As shown in FIG. 2, in a possible embodiment, width of the recessed portion 21 is $l_1$, width of the insulation coating layer region is m, width of the tab is n, where a relationship between $l_1$ and m and n is $l_1 = \frac{1}{2}m + n$.

The width $l_1$ of the recessed portion 21 is a sum of ½ the width m of the insulation coating layer region 11 and the width n of the tab 12, so that in a projection of the electrode plate 1 in the thickness direction, a projection of the tab 12 can be entirely located within a projection of the recessed portion 21. After the first roller 2 deflects due to a large rolling pressure, the recessed portion 21 also deforms with the first roller 2, an opening of the recessed portion 21 becomes smaller, and the width of the recessed portion 21 is a sum of ½ the width of the insulation coating layer region 11 and the width of the tab 12, making the width of the recessed portion 21 still greater than the width of the tab 12 after deformation. This reduces the probability of a surface of the first roller 2 coming into contact with the tab 12, thus lowering the risk of crushing the tab 12.

As shown in FIG. 2, in a possible embodiment, each edge of the recessed portion 21 is provided with a first chamfer 22, making cross-sectional area of the recessed portion 21 gradually increase along the radial direction of the first roller 2.

The provision of the first chamfer 22 at each edge of the recessed portion 21 can reduce indentations on the tab 12 caused by a pressure coming from the concentrated rolling pressure at the edge of the recessed portion 21, thus lowering the risk of cracking the tab 12 in the subsequent ultrasonic welding. The cross-sectional area of the recessed portion 21 gradually increases along the radial direction of the first roller 2, so that the width of the opening of the recessed portion 21 can be the same as the widths of the insulation coating layer region 11 and the tab 12 on the electrode plate 1. This reduces the probability of the insulation coating layer region 11 coming into contact with a surface of the first roller 2 in the process of rolling the electrode plate 1, lowers the risk of crushing the insulation coating layer region 11, and improves the processing efficiency of the electrode plate 1.

Figure 3:
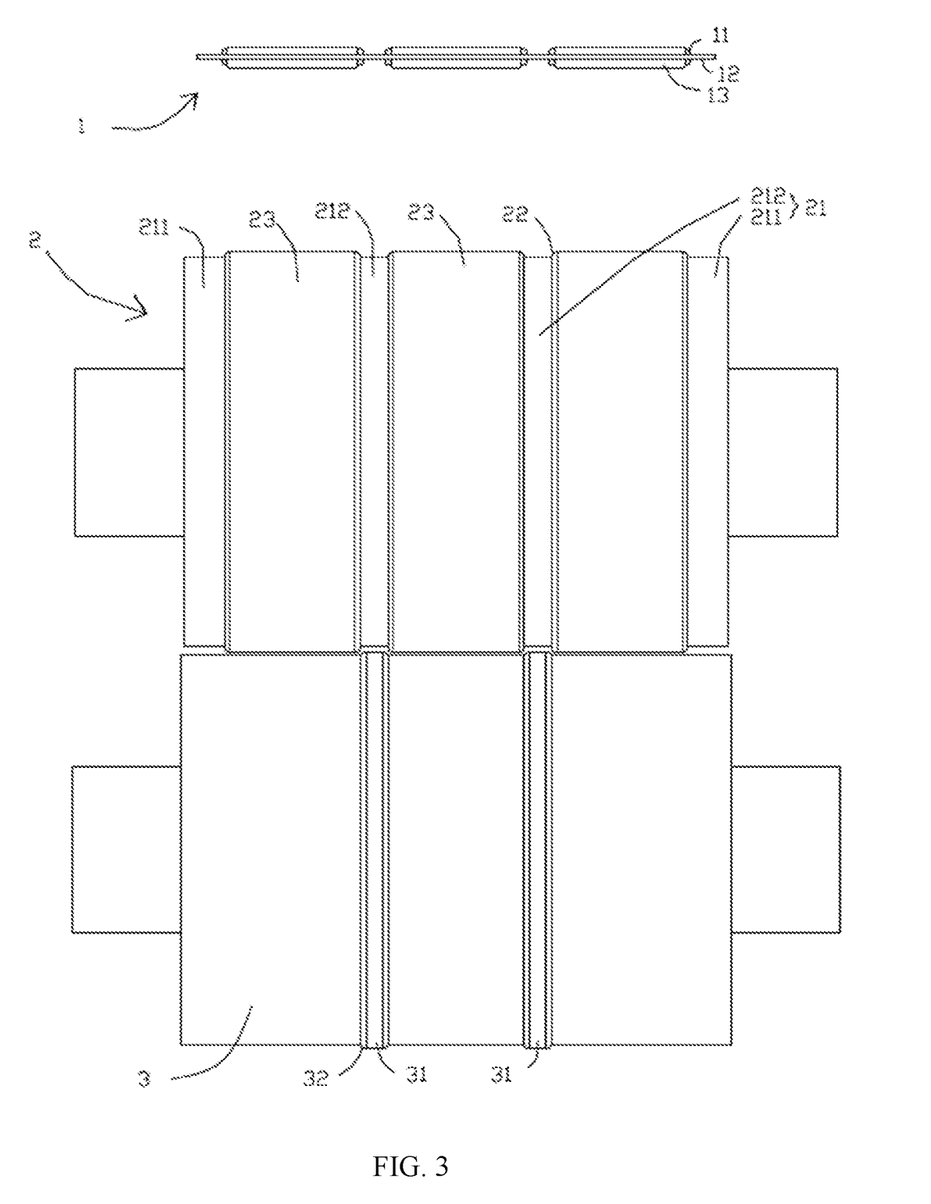
FIG. 3 is a schematic structural diagram of a rolling apparatus according to some embodiments of this application.

As shown in FIG. 3, in a possible embodiment, the electrode plate 1 includes film-coating regions 13, the first roller 2 includes first protruding portions 23, the film-coating region 13 is in contact with the first protruding portion 23, and a surface of the first roller 2 is in no contact with the tab 12 and the insulation coating layer region 11.

The film-coating region 13 being in contact with the first protruding portion 23 makes the film-coating region 13 subjected to a pressure applied by the first roller 2, thus achieving a desired compacted density (positive electrode: from 2.8 g/cm³ 2.8 g/cm³ to 3.5 g/cm³ 3.5 g/cm³; negative electrode: from 1.3 g/cm³ 1.3 g/cm³ 2.8 g/cm³ to 1.7 g/cm³ 1.7 g/cm³) of the film-coating region 13. The surface of the first roller 2 being in no contact with the tab 12 and the insulation coating layer region 11 makes the tab 12 and the insulation coating layer region 11 not subjected to a pressure applied by the first roller 2, thus lowering the risk of crushing the tab 12 and the insulation coating layer region 11.

As shown in FIG. 3, in a possible embodiment, the second roller 3 includes second protruding portions 31, and at least part of the second protruding portion 31 is able to extend into the recessed portion 21 of the first roller 2. The second protruding portion 31 is configured to contact the tab 12, making the tab 12 protrude along the thickness direction of the electrode plate 1.

With the second protruding portion 31 being in contact with the tab 12, the tab 12 protrudes along the thickness direction of the electrode plate 1 after rolling, so that redundancy in the tab 12 region can be released, where such redundancy is produced due to the lateral elongation of the film-coating region 13 being greater than the lateral elongation of the tab 12 region after the electrode plate 1 is rolled. This reduces wrinkling of the tab 12 region, thus lowering the risk of fracturing in the subsequent processes of stretching and ultrasonic welding, decreasing production costs of the electrode plate 1, and improving production efficiency.

As shown in FIG. 3, in a possible embodiment, the recessed portion 21 includes a plurality of first recessed portions 211 and a plurality of second recessed portions 212, the first recessed portions 211 are located at two opposite sides of the first roller 2 in an axial direction of the roller 2, and the plurality of second recessed portions 212 are located between two first recessed portions 211. At least part of the second protruding portion 31 is able to extend into the second recessed portion 212, and a position at the second roller 3 corresponding to the first recessed portion 211 is provided with no second protruding portion 31.

Since the tab 12 corresponding to the first recessed portion 211 has a free end, redundancy of the tab 12 produced by different elongations can be released through the free end, and no wrinkling occurs. Therefore, the position at the second roller 3 corresponding to the first recessed portion 211 can be provided with no second protruding portion 31. The position at the second roller 3 corresponding to the first recessed portion 211 being provided with no second protruding portion 31 can reduce processing procedures in the process of producing the second roller 3, thus saving processing costs of the second roller 3 and improving the production efficiency of the second roller 3.

Figure 4:
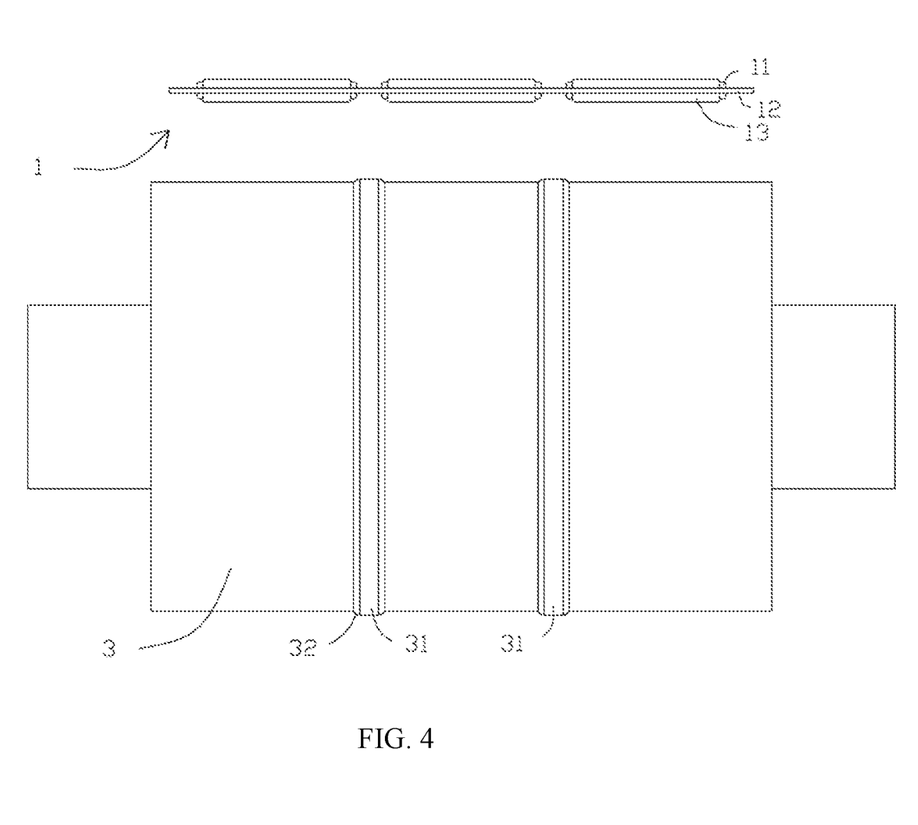
FIG. 4 is a schematic structural diagram of a second roller according to some embodiments of this application.

As shown in FIG. 4, in a possible embodiment, height of the second protruding portion 31 protruding out of a surface of the second roller 3 is 30 micrometers to 80 micrometers, and preferably, the height of the second protruding portion 31 protruding out of the surface of the second roller 3 is 50 micrometers.

If the height of the second protruding portion 31 protruding out of the surface of the second roller 3 is less than 30 micrometers, in the process of rolling the electrode plate 1, the second protruding portion 31 is unable to make the tab 12 protrude to a desired height in the thickness direction of the electrode plate 1, and redundancy produced by the different elongations of the tab 12 and the film-coating region 13 cannot be fully released. The tab 12 may still wrinkle and subsequently fracture in the processes of stretching and ultrasonic welding. If the height of the second protruding portion 31 protruding out of the surface of the second roller 3 is greater than 80 micrometers, in the process of rolling the electrode plate 1, the second protruding portion 31 makes the tab 12 protrude to a height greater than the desired height in the thickness direction of the electrode plate 1. Therefore, the tab 12 is more severely deformed, which in turn reduces mechanical properties of the tab 12, and makes fracture likely to occur in the subsequent processes of stretching and ultrasonic welding. If the height of the second protruding portion 31 is 50 micrometers, most redundancy at the tab 12 of the electrode plate 1 can be released without causing wrinkling at the tab 12 or crushing the tab 12.

As shown in FIG. 4, in a possible embodiment, each edge of the second protruding portion 31 is provided with a second chamfer 32, and the second chamfer 32 makes cross-sectional area of the second protruding portion 31 gradually decrease along a radial direction of the second roller 3.

The provision of the second chamfer 32 at each edge of the second protruding portion 31 can reduce indentations on the tab 12 caused by a pressure coming from the concentrated rolling pressure at the edge, thus lowering the risk of fracturing the tab 12 in the subsequent stretching or cracking the tab 12 in the subsequent ultrasonic welding.

As shown in FIG. 4, in a possible embodiment, width of the second protruding portion 31 is $l_2$, width of the insulation coating layer is m, width of the tab 12 is n, where a relationship between $l_2$, m and n is $l_2=\frac{1}{2}m+n$, $l_2=\frac{1}{2}m+n$.

The width $l_2$ of the second protruding portion 31 corresponding to the recessed portion 21 is a sum of ½ the width m of the insulation layer region and the width n of the tab 12. Since the cross-sectional area of the second protruding portion 31 decreases along the radial direction of the second roller 3, the second protruding portion 31 can apply a pressure on the tab 12 without affecting the insulation layer region 11, and the width of the second protruding portion 31 in contact with the tab 12 can be the same as the width of the tab 12. Therefore, in the process of rolling, the second protruding portion 31 allows the tab 12 to protrude out of the surface of the electrode plate 1 without changing the width of the tab 12, reducing the impact on the subsequent processing.

This application provides a processing device for processing the electrode plate 1, and the processing device includes the rolling apparatus according to any of the foregoing embodiments.

In the process of rolling the electrode plate 1, the roller may deflect due to a large rolling pressure, and the tab 12 and the insulation coating layer region 11 may be crushed as a result. In the prior art, a cross section of the roller body is set as a curved surface, and the roller deflects under a large pressure, making the working surface flat; or a surface of the roller is only provided with a boss, making the elongations of the tab 12 and the film-coating region 13 nearly equal in the process of rolling the electrode plate. By contrast, when the processing device according to the embodiments of this application is used to process the electrode plate 1, a gap is reserved for the tab 12 and the insulation coating layer region 11, keeping them from coming into contact with the first roller 2, thus lowering the risk of crushing the tab 12 and the insulation coating layer region 11 and reducing fractures of the electrode plate 1 in the subsequent stretching or cracks of the electrode plate in the subsequent ultrasonic welding. After rolling of the electrode plate 1, due to different elongations of the tab 12 region and the film-coating region 13, redundancy may occur at the tab 12 having film-coating regions 13 on its two sides, resulting in wrinkling at the tab 12. The provision of the second protruding portion 31 at the second roller 3 can release the redundancy and reduce wrinkling at the tab 12. Such processing device ensures the compaction degree of the electrode plate 1, and reduces the probability of damaging the tab 12, thus decreasing production costs and improving production yields.

This application relates to a rolling apparatus and a processing device, which are used for rolling an electrode plate 1. The rolling apparatus includes a first roller 2 and a second roller 3, where the first roller 2 and the second roller 3 are disposed at two sides of the electrode plate 1 in a thickness direction of the electrode plate 1. The first roller 2 is provided with a plurality of recessed portions 21, the electrode plate 1 includes a plurality of insulation coating layer regions 11 and a plurality of tabs 12, and in a projection of the electrode plate 1 in the thickness direction, at least part of a projection of the insulation coating layer region 11 and a projection of the tab 12 are located within a projection of the recessed portion 21. The rollers deflect under a large rolling pressure. The recessed portion 21 can make a gap for the tab 12 when the first roller 2 deflects, reducing the probability of the first roller 2 coming into contact with the tab 12, lowering the risk of crushing the tab 12 by the rollers, and reducing fractures in the subsequent processes of stretching and ultrasonic welding.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A rolling apparatus, wherein the rolling apparatus is configured to roll an electrode plate, the electrode plate has two sides and comprises a plurality of insulation coating layer regions and a plurality of tabs alternatingly arranged along a width direction of the electrode plate, and the rolling apparatus comprising:

a first roller disposed on one of the two sides of the electrode plate, and said first roller having a plurality of first protrusions and a plurality of recessed portions alternatingly arranged along an axial direction of the first roller, wherein the plurality of first protrusions respectively correspond to the plurality of insulation coating layer regions of the electrode plate, and the plurality of recessed portions respectively correspond to the plurality of tabs of the electrode plate; and a second roller disposed on the other one of the two sides of the electrode plate, and said second roller having a plurality of second protrusions respectively corresponding to the plurality of tabs of the electrode plate and the plurality of recessed portions of the first roller;

wherein in a thickness direction of the electrode plate, at least a part of a projection of the insulation coating layer region and a projection of the tab adjacent to the insulation coating layer region are located within a projection of the corresponding recessed portion; and wherein in the thickness direction of the electrode plate further includes at least a part of the second protruding portion of the second roller is able to extend into the corresponding recessed portion of the first roller.

2. The rolling apparatus according to claim 1, wherein a depth of the recessed portion is 50 micrometers to 150 micrometers.

3. The rolling apparatus according to claim 1, wherein width of the insulation coating layer region is m, a width of the tab is n, and width of the recessed portion is $l_1$, wherein $l_1$ is based on an expression of: $l_1 = \frac{1}{2}m + n$.

4. The rolling apparatus according to claim 1, wherein each edge of the recessed portion is provided with a first chamfer.

5. The rolling apparatus according to claim 1, wherein the electrode plate comprises a plurality of film-coating regions respectively included within the plurality of insulation coating layer regions and corresponding to the plurality of first protruding portions of the first roller, each one of the first protruding portions is in contact with the corresponding film-coating region, and a surface of the first roller is not in contact with the tab and the insulation coating layer region.

6. The rolling apparatus according to claim 1, wherein each one of the second protruding portions is in contact with the corresponding tab of the electrode plate.

7. The rolling apparatus according to claim 6, wherein the plurality of recessed portions comprise two first recessed portions and a plurality of second recessed portions, the first recessed portions are respectively located at two opposite sides of the first roller in the axial direction of the first roller, the second recessed portions are located between the two first recessed portions, and the at least part of the second protruding portion is configured to extend into the second recessed portion.

8. The rolling apparatus according to claim 6, wherein a height of the second protruding portion is 30 micrometers to 80 micrometers.

9. The rolling apparatus according to claim 6, wherein each edge of the second protruding portion is provided with a second chamfer.

10. The rolling apparatus according to claim 6, wherein width of the insulation coating layer region is m, a width of the tab is n, and width of the second protruding portion is $l_2$, wherein $l_2$ is based on an expression of: $l_2 = \frac{1}{2}m + n$.

* * * * *